(12) United States Patent
Ponnuswamy et al.

(10) Patent No.: US 9,456,364 B2
(45) Date of Patent: Sep. 27, 2016

(54) DYNAMICALLY MODIFYING SCANNING METHODS AND/OR CONFIGURATIONS

(71) Applicant: Aruba Networks, Inc., Sunnyvale, CA (US)

(72) Inventors: Subbu Ponnuswamy, Saratoga, CA (US); Kiranmaye Sirigineni, Sunnvyale, CA (US); Nethra Muniyappa, San Jose, CA (US)

(73) Assignee: Aruba Networks, Inc., Sunnyvale, CA (US)

( * ) Notice: Subject to any disclaimer, the term of this patent is extended or adjusted under 35 U.S.C. 154(b) by 201 days.

(21) Appl. No.: 14/097,183

(22) Filed: Dec. 4, 2013

(65) Prior Publication Data
US 2015/0156645 A1    Jun. 4, 2015

(51) Int. Cl.
*H04W 24/06*    (2009.01)
*H04W 48/16*    (2009.01)

(52) U.S. Cl.
CPC ............. *H04W 24/06* (2013.01); *H04W 48/16* (2013.01)

(58) Field of Classification Search
CPC ... H04W 40/16; H04W 40/12; H04W 28/20; H04W 28/048; H04W 28/0263; H04W 28/0252; H04W 28/0231; H04W 16/12; H04W 24/06
See application file for complete search history.

(56) References Cited

U.S. PATENT DOCUMENTS

| | | | | |
|---|---|---|---|---|
| 2004/0213288 A1* | 10/2004 | Lynn | ..................... | G06F 3/0613 370/468 |
| 2007/0008264 A1* | 1/2007 | Ogawa | .................... | G09G 5/003 345/87 |
| 2009/0074033 A1* | 3/2009 | Kattwinkel | .......... | H04B 1/7143 375/132 |
| 2009/0247206 A1* | 10/2009 | Yacono | ................. | H04W 24/02 455/515 |
| 2009/0279457 A1* | 11/2009 | Lucas | .................... | H04W 56/00 370/280 |
| 2010/0105332 A1* | 4/2010 | McHenry | .............. | H04W 16/14 455/62 |
| 2012/0057534 A1* | 3/2012 | Park | ..................... | H04W 72/082 370/329 |
| 2015/0003434 A1* | 1/2015 | Shi | ........................ | H04W 24/10 370/338 |

* cited by examiner

*Primary Examiner* — Faruk Hamza
*Assistant Examiner* — Abu-Sayeed Haque

(57) ABSTRACT

Adapting scanning of frequency channels of different or varying widths to collect wideband spectrum data is disclosed. Scanning methods and/or configurations are modified based upon the type and signal strength of the interferers present or expected in the spectrum. The system includes: selecting a portion for scanning, wherein the portion includes contiguous and non-contiguous segments, partitioning the selected portion into a first plurality of channels, where at least two of the plurality of channels have different widths, each of the first plurality of channels including contiguous or non-contiguous segments; during a first scan of the selected portion, scanning the selected portion of the radio frequency spectrum at least by scanning a first channel with a first width and scanning a second channel with a second width that is different than the first width; and based on the first scan, collecting data representing the selected portion of the radio frequency spectrum.

20 Claims, 10 Drawing Sheets

600

COVER THE ENTIRE 5 GHZ FREQUENCY SPECTRUM WITH TWO SCAN PASSES BY DESIGNATING EACH 20MHZ CHANNEL AS A PRIMARY CHANNEL
602

↓

IN A FIRST SCAN PASS, SCAN EACH 40MHZ CHANNEL BY DESIGNATING THE LOWER 20MHZ CHANNEL AS THE PRIMARY 20MHZ CHANNEL
604

↓

ALSO IN THE FIRST SCAN PASS, SCAN ALL 20MHZ ONLY CHANNELS (E.G., CHANNELS 140, 165)
606

↓

IN A SECOND SCAN PASS, SCAN THE 40MHZ CHANNELS BY DESIGNATING UPPER 20MHZ CHANNEL AS THE PRIMARY 20MHZ CHANNEL
608

↓

ALSO IN THE SECOND SCAN PASS, SCAN THE 20MHZ ONLY CHANNELS
610

↓

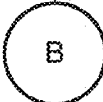

MODIFY SCANNING METHOD AND/OR CONFIGURATION (ALGORITHM) TO EXTEND TO 160 MHZ/80 + 80 MHZ FREQUENCY CHANNELS
FIRST SCAN TWO 160 MHZ CHANNELS (36-64 & 100-128) & THE 80+80 MHZ (132-144 + 149-161) CHANNEL AND THE 20 MHZ CHANNEL 165
1002

IN A FIRST SCAN PASS, SCAN THE 160 MHZ CHANNEL FOUR TIMES, BY DESIGNATING ONE OF THE 20MHZ SUB-CHANNELS OF A 40 MHZ CHANNEL AS PRIMARY
1004

IN A SECOND SCAN PASS, DESIGNATE THE OTHER 20MHZ SUB-CHANNEL OF THE 160 MHZ CHANNEL AS PRIMARY
1006

FOR SCANNING THE 80+80 MHZ CHANNEL
1. SCAN IT FOUR TIMES IN A SCAN PASS WITH FOUR DIFFERENT 20MHZ CHANNELS DESIGNATED AS PRIMARY, EACH OF THE 20MHZ CHANNELS SELECTED FROM A 40MHZ CHANNEL
1008

FIG. 10

DYNAMICALLY MODIFYING SCANNING METHODS AND/OR CONFIGURATIONS

FIELD

The present disclosure relates to wireless digital networks. In particular, the present disclosure relates to dynamically modifying scanning methods and/or configurations or adaptive scanning of frequency channels of variable widths to capture wideband spectrum data in order to detect interferers on wireless digital networks.

BACKGROUND

Wireless digital networks provide users secure and cost-effective access to resources. Such wireless digital networks typically have a plurality of access points (AP) located throughout a designated area, by which the users can access the resources they desire. Wi-Fi networks operating in accordance with IEEE 802.11 standards are examples of such networks. The frequencies used by these networks are shared. They are shared not only among the wireless digital networks themselves, but also with other non-network devices. These shared frequencies face intermittent and continuous interference received from other non-network devices, including radio-frequency devices, such as microwave ovens, wireless video streaming devices, cordless telephones, and the like, as well as other adjacent wireless networking devices. Unfortunately, the effects of these types of interfering devices can vary. As an example, simply replacing or adding a microwave oven in a particular area where a particular wireless digital network is operating can dramatically alter the interference levels present within that particular wireless digital network.

To identify the sources of interference that obstruct operation of a wireless digital network, various types of test equipment and functionalities are used, for example, spectrum analyzers. Although sophisticated spectrum analyzers exist, which include receivers that may be calibrated to display and measure signals over a wide range of frequencies and amplitudes, such sophisticated devices are costly and often not used for continuous monitoring and management of wireless digital networks. Wireless digital networks contain access points (AP) and wireless client devices, both examples of narrowband network (radio) devices with scanning functionality.

Each radio device (e.g., access point) periodically scans the frequency spectrum to detect and identify potential interference. The frequency spectrum is a frequency range that is divided into multiple channels. The time required to scan the entire frequency spectrum is proportional to the number of channels that are scanned and the type of information that needs to be collected. Hence, considerable time can lapse before a radio device (access point) can scan the same channel again. Frequent scanning of channels is critical to yield updated channel information, which is used to detect and identify wireless interference.

As a related consideration, many network devices, for example, access points (APs) support variable frequency channel widths, including for example, 20 MHz, 40 MHz and 80 MHz channels. They may also support 160 MHz or other channel widths. Existing systems and methods for scanning frequency spectrums are limited to scanning of fixed-width frequency channels or a predetermined sequence of channels A typical spectrum analyzer configured to use these fixed-width or narrowband radio frequencies may need to collect information such as wireless frames in compliance with IEEE 802.11 standards, spectral analysis FFT (Fast Fourier Transform) plots, noise floor, and channel utilization (Tx and Rx) on various channels. Spectrum analysis also requires that information on a wideband frequency spectrum (for example, the entire 2.4 GHz or 5 GHz band) be collected at fixed-time intervals (for example, ranging anywhere from 500 milliseconds to 2 seconds). These fixed-time intervals dictate the amount of time to be spent in search of interference activity or "dwell" time on each channel. It is virtually impossible to scan all possible channels and channel widths within the fixed-time intervals or dwell times that are typically allocated for scanning of channels.

Moreover, other information such as noise floor and channel utilization may depend on the width of the selected channel, depending on the activities on parts of the channel and due to implementation constraints of the network devices themselves.

Therefore, it is desirable to have enhanced ways for scanning frequency spectrums effectively and efficiently to capture wideband spectrum data to accurately detect and identify interference in wireless digital networks. It is also desirable to have enhanced ways to report channel status, such as noise floor, Wi-Fi and non-Wi-Fi channel utilization, ACI, number and types of Wi-Fi, and non-Wi-Fi devices.

BRIEF DESCRIPTION OF THE DRAWINGS

The present disclosure may be best understood by referring to the following description and accompanying drawings that are used to illustrate some embodiments of the present disclosure.

FIG. 6 illustrates an example process flow according to some embodiments of the present disclosure, for adaptive scanning of a 5 GHz frequency spectrum. This example process flow illustrates a scanning operation based on a basic algorithm for use with network devices that support 40 MHz frequencies.

FIG. 10 is an example process flow illustrating adaptive scanning operations (algorithms), according to some embodiments of the present disclosure, for use with 160 MHz and 80+80 MHz frequency channels.

DETAILED DESCRIPTION

Figure 1:
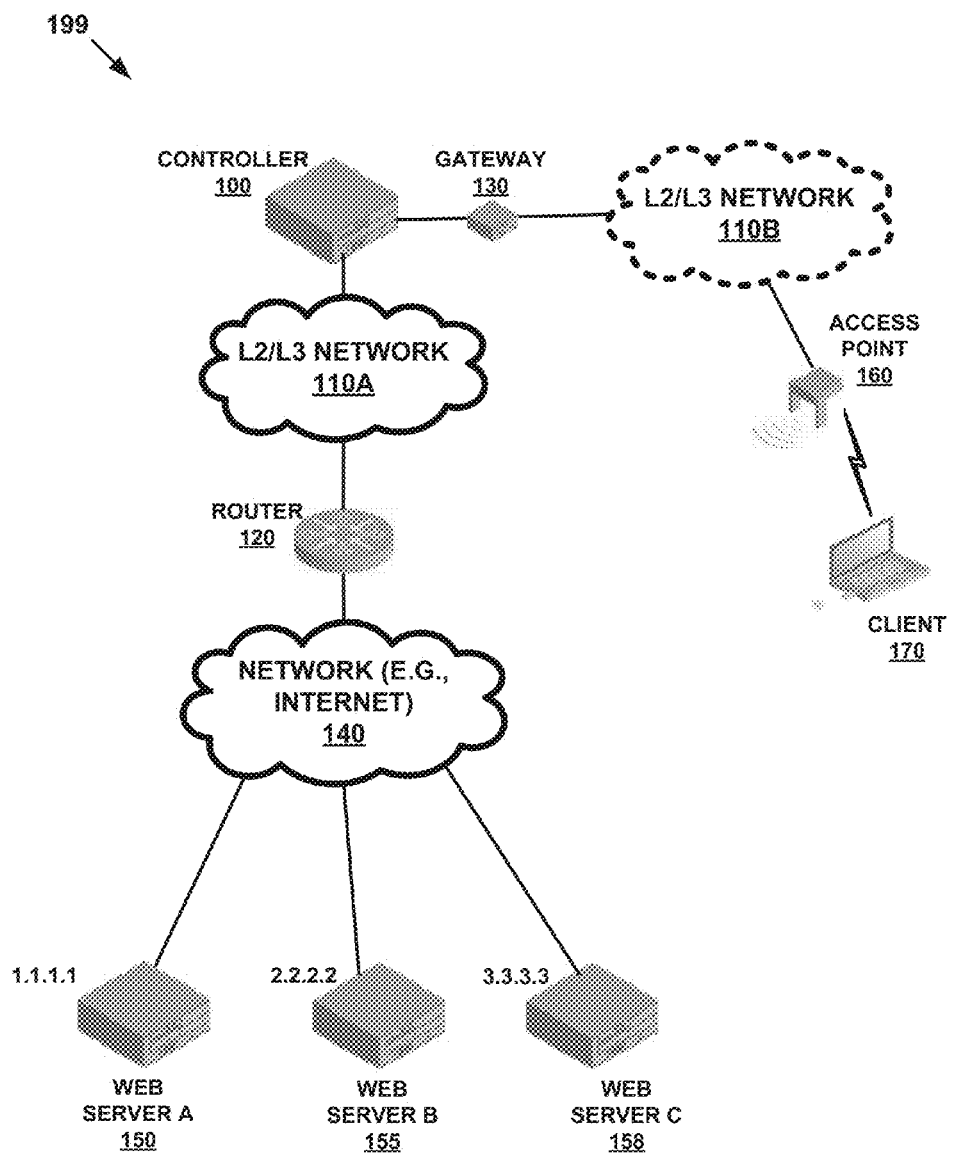
FIG. 1 is a block diagram illustrating an example network environment according to some embodiments of the present disclosure.

In the following description, several specific details are presented to provide a thorough understanding. Although the context of the disclosure is directed to enhanced ways of dynamically modifying scanning methods and/or configurations or obtaining wideband spectrum data by variable and adaptive scanning of channels of different widths, one skilled in the relevant art will recognize, however, that the concepts and techniques disclosed here can be practiced without one or more of the specific details, or in combination with other components, etc. In other instances, well-known implementations or operations are not shown or described in detail to avoid obscuring aspects of various examples disclosed herein. It should be understood that this disclosure covers all modifications, equivalents, and alternatives falling within the spirit and scope of the present disclosure.

Overview

Some embodiments of the present disclosure relate to enhanced scanning functionality in a narrowband network device or system. It should be recognized that the scanning functionality described in this disclosure can be implemented in any radio, including an access point of a wireless digital network, client devices, mesh nodes, etc. This functionality facilitates variable and adaptive scanning of a spectrum of frequency channels of varying or different widths. This functionality includes dynamically modifying scanning methods and/or configurations. In particular, the present disclosure relates to scanning the entire wide spectrum of frequency channels to capture or collect wideband spectrum data for analysis in identifying interference in wireless digital networks. Wideband spectrum data may be captured by a narrowband network device to form a spectrum covering a much wider frequency band. Sampling of spectrum data, for example, Fast Fourier Transform (FFT) data captured from a narrowband receiver such as an IEEE 802.11 Wi-Fi receiver, are combined to generate representative real-time FFT, average FFT, and FFT duty cycle data of a wideband spectrum.

In some embodiments, spectrum data is captured by a narrowband network device, operating on a particular channel, with a given frequency and channel width. Spectrum data samples are collected from multiple channel scans that may overlap or not, and these are combined to form a representative spectrum band for analysis.

The system and methods according to some embodiments of this disclosure support spectrum analysis functions using data captured from a narrowband network device such as an IEEE 802.11 device. The network device may or may not be set up to provide services to IEEE 802.11 clients while acting as a spectrum analyzer. Suitable network devices include the radios in network access points and in wireless client devices where such data capture is supported by the software and/or hardware operating the radio.

An IEEE 802.11 radio is capable of receiving signals that fall within 5 to 160 MHz wide channels, since IEEE 802.11 channels vary from 5 MHz or 160 MHz wide. Future IEEE 802.11 radios may be able to operate in wider channels. The width of the channel in an 802.11 radio receiver is restricted to the channel widths defined by the IEEE.

There may also be other constraints such as a need to receive 802.11 frames, provide intrusion detection systems (IDS), and support interference classification that may limit the channel widths and dwell times that can be used by an 802.11 radio device.

It should be recognized that the methods described here apply to any narrowband receiver, for example one implementing IEEE 802.11, IEEE 802.16 or IEEE 802.15 standards or similar protocols that can be used to construct either a stand-alone spectrum analyzer or a spectrum analyzer that provides spectrum analysis functions along with any combination of client connectivity services (e.g., an access point (AP)), Interference Classification, or IDS (intrusion detection system).

For spectrum analysis, the spectrum of interest at any instant may be as wide as 200 MHz or more. The spectrum may be contiguous or non-contiguous. To support such wideband spectrum visibility using a narrowband network device, the spectrum analyzer (radio) "scans" multiple channels in real-time and combines the time and frequency domain information gathered from the multiple channels scanned, to form a comprehensive view of the wideband spectrum data. The spectrum analysis function selects the best sampling of FFT data among the hundreds or thousands of data samples that may be collected per second. The sampling is taken to accurately represent the view of the spectrum. The entire spectrum may be displayed on a device such as a computer display.

A Fourier transform sample, such as, an FFT data sample, from a narrowband network device may be represented as a set of amplitude values where each amplitude value corresponds to a frequency bin. The number of frequency bins in an FFT data sample is determined by the channel width and the FFT size. For example, an FFT on a 20 MHz channel may produce FFT data samples with 64 frequency bins, where each bin represents 312.5 KHz (i.e., 20 MHz/64). Other parameters associated with FFT include the starting frequency, the sampling time, and the sampling frequency or interval. The sampling time is the amount of time spent taking one FFT data sample and the sampling frequency is the number of samples per second.

For each scan operation, the dwell time, which is the amount of time designated for looking for activity on each channel, may be adjusted. In some instances, the dwell time on each channel may be fixed. In some instances, the dwell time may vary based on certain conditions or criteria. A fixed dwell time is obtained by dividing the total display interval (e.g., one second) by a multiple of the number of channels to be scanned. For example, in the event a display interval is one second and the number of channels to be scanned is five, the default dwell time would be computed to be 200 milliseconds (1000/5) per channel. In some instances, the default dwell time may also be designated as 100 milliseconds (1000/(2×5)), when the spectrum analyzer scans each channel twice within the time interval of one second. Fixed dwell times may not be appropriate under all circumstances. One such scenario is when the spectrum analyzer also supports IDS (intrusion detection system). A network device supporting IDS (intrusion detection system) and spectrum analysis must be able to adaptively determine the dwell time on each channel so that IDS (intrusion detection system) functions can be effectively supported without affecting the ability to receive representative FFT information from all channels for an accurate FFT display. In some embodiments, the interferer profile of an interfering device is used to determine the amount of time spent on each channel (dwell time), the sequence of scanning, and the number of times to visit a channel per display interval.

In some embodiments, when interferers or rogue devices are detected on a specific 802.11 channel, those channels are scanned with greater frequency. Dwell times are adjusted to capture sufficient 802.11 frames and/or FFT data samples to perform the necessary IDS and interference detection functions.

The device or system and methods of the present disclosure modify the scanning methods used, based upon determining the type and strength of the interfering signals that are either detected or expected to be present in the spectrum. The wideband spectrum data that is collected may be used for myriad purposes including, but not limited to, classification (e.g., interferers), spectrum displays, alerts, and RF management based on metrics such as noise, interferer duty cycle, and channel utilization etc.

Specifically, the device/system and methods in accordance with some embodiments of the present technology perform adaptive scanning operations on portions or segments of a radio frequency spectrum of channels. In some embodiments, the segments are selected when channels in the radio frequency spectrum have different or varying widths. For example, many network devices support variable channel widths, including for example, 20 MHz, 40 MHz, 80 MHz, and 160 MHz channels. Future devices may support wider or other channel widths.

In some embodiments, spectrum analyzers or functions require information such as 802.11 frames, FFTs, noise floor, and channel utilization (Tx and Rx) collected from various frequency channels. In some embodiments, spectrum analysis applications also require that the information on the wideband channels, for example, the entire 2.4 GHz or 5 GHz band must be collected at small, fixed-time intervals, for example, ranging from 500 milliseconds to 2 seconds. Because it is virtually impossible to scan all possible channels and channel widths in the radio frequency spectrum within the fixed-time intervals that are allocated for these operations, adaptive scanning by modifying scanning algorithms is advantageous.

Adaptive scanning functionality addresses implementation constraints of wireless devices. Also, it provides flexible alternatives as there are many ways to scan a frequency channel with a width greater than 20 MHz (e.g., by designating different primary channels).

The device/system and methods of the present disclosure scan the entire frequency bandwidth to capture wideband spectrum data, by adaptively modifying underlying algorithms for scan operations. The modifications depend on the type and strength of the interfering signals that are either present or expected or the level of Wi-Fi activity within a particular wireless area. The network devices are configured to scan radio frequency channels in segments. In some implementations, a first segment, portion, or partition may include frequency channels with a width that is different than frequency channels in a second segment, portion, or partition. The system and methods are configured to scan each of the segments in the radio frequency spectrum within the particular time period allocated. The data samples collected from each scan are combined to reflect the wideband data. This combined data more accurately reflects the extent of interfering signals, either present or expected. Some channels are known or likely to have more interferers and/or 802.11 network devices. As one example, microwave ovens operate in a specific frequency range in the 2.4 GHz band. As another example, 5 GHz cordless telephones operate in a specific portion of the UNII band. The adaptive scanning algorithms assign a higher weight to those channels to provide scanning priority and increased dwell times as determined.

When a certain type of interferer (e.g., a frequency hopper such as a 2.4 GHz frequency hopping telephone) is partially detected in a channel, the scanning algorithm adaptively changes the dwell time on the channel. By this, it receives sufficient samples on that channel to determine the type and subtype of the interferer (e.g., Bluetooth, Xbox, cordless telephone, video transmitter, or audio transmitter).

The adaptive scanning algorithms select among multiple channel widths that may be supported by a particular network device, including 20 MHz and 40 MHz channels. One advantage of scanning the 20 MHz channels is that the identity of all 802.11 network devices (including those operating in 20 MHz and 40 MHz channels) can be easily and reliably decoded based on beacon and other management frame transmissions. If only 40 MHz channels are scanned, 20 MHz 802.11 devices operating on the extended channel (i.e., one half of the 40 MHz channel) or 40 MHz 802.11 devices operating with the different combinations of primary and extension channels may not be reliably detected. One advantage of scanning 40 MHz or 80 MHz channels is that the frames transmitted on the entire 40 MHz or 80 MHz channel width can be reliably detected and therefore their duty cycle can be properly accounted for.

Yet, 40 MHz scanning has fewer channels to scan, and the FFT information obtained from 40 MHz channels is sufficient to classify interference sources. The algorithms use a combination of 20 MHz and 40 MHz scanning to optimize scan efficiency, without sacrificing the ability to receive and decode 802.11 signals or determine interferers. A threshold may be set to determine the time interval within which the spectrum analyzer must scan all possible 20 MHz channels within the selected band at least once. The scanning order and dwell time can be combined with this threshold to select the ordering and dwell times of each 20 MHz or 40 MHz channel. The same process can be extended to 80 MHz channels or higher width channels when available.

The device/system and scanning methods use various adaptive algorithms that alternate between selection of primary and secondary channels across different scan operations to cover all channels within a full radio frequency spectrum with multiple passes. The "dwell times" designated to cover all the channels of the full spectrum remain short, hence variable dwell times are designated for scanning of the various segments. Larger dwell times are allocated for channels where non-interfering signals are present or expected. Medium dwell times are allocated for channels where most Wi-Fi activity is present or expected and lower dwell times are allocated where less Wi-Fi activity is present or expected. Dwell times are dynamically adjusted based on the levels of interfering signals and levels of Wi-Fi activity that is detected.

Computing Environment

FIG. 1 shows an exemplary digital network environment 199 according to some embodiments of the present disclosure. FIG. 1 illustrates at least one or more network controllers (for example, controller 100), one or more access points (for example, access point 160), one or more client devices (for example, client 170), a layer 2 or layer 3 network 110, a routing device (for example, router 120), a gateway 130, a network (e.g., the Internet) 140, and one or more web servers (for example, web server A indicated by reference numeral 150, web server B indicated by reference numeral 155, and web server C indicated by reference numeral 158), etc. The components of the digital network environment 199 are communicatively coupled to each other. In some embodiments, the digital network environment 199 may include other components not separately referenced in FIG. 1 for example, an email server, a cloud-based storage device, etc. It is intended that any of the servers shown may represent an email server instead as illustrated with email functionalities and any of the network devices may serve as a cloud-based storage device. The network 140 may be implemented within a cloud environment.

The controller 100 is a hardware device and/or software module that manages the network elements, which include but are not limited to, either controlling, planning, allocating, deploying, coordinating, and monitoring the resources of a network, network planning, frequency allocation, predetermined traffic routing to support load balancing, cryptographic key distribution authorization, configuration management, fault management, security management, performance management, bandwidth management, route analytics and accounting management, etc.

Moreover, a number of access points, for example, access point 160, may be interconnected with the network controller 100. Each access point 160 may be interconnected with one or more client devices via either a wired interface or a wireless interface. In the example that is shown, for illustration purposes only, the client 170 is associated with the access point 160 via a wireless link. An access point 160 generally refers to a network device that allows wireless clients to connect to a wired network. Access points 160 usually connect to a controller 100 via a wired network or can be a part of a controller 100 in itself. For example, the access point 160 is connected to the controller 100 via an optional L2/L3 network 110B.

Wired interfaces typically include IEEE 802.3 Ethernet interfaces, used for wired connections to other network devices such as switches, or to a controller. Wireless interfaces may be WiMAX, 3G, 4G, and/or IEEE 802.11 wireless interfaces. In some embodiments, controllers and APs may operate under control of operating systems, with purpose-built programs providing host controller and access point functionality Furthermore, the controller 100 can be connected to the router 120 through zero or more hops in a layer 3 or layer 2 network (such as L2/L3 Network 110A). The router 120 can forward traffic to and receive traffic from the network, such as the Internet 140. The router 120 is generally a network device configured to forward data packets among different networks, and thus creating an overlay internetwork. A router 120 is typically connected to two or more data lines from different networks. When a data packet comes in one of the data lines, the router 120 reads the address information in the packet to determine its destination. Then, using information in its routing table or routing policy, the router 120 directs the packet to the next/different network. A data packet is typically forwarded from one router 120 to another router 120 through the network (e.g., Internet) 140 until the packet reaches its final destination.

The gateway 130 is a network device configured to pass network traffic from a local subnet to devices on other subnets. In some embodiments, the gateway 130 may be connected to a controller 100 or be a part of the controller 100 depending on the configuration of the controller 100.

Web servers 150, 155, and 158 are hardware devices and/or software modules that facilitate delivery of web content that can be accessed through the Internet 140.

For example, the web server A indicated by reference numeral 150 may be assigned an IP address of 1.1.1.1 and used to host a first Internet website (e.g., www.yahoo.com); the web server B indicated by reference numeral 155 may be assigned an IP address of 2.2.2.2 and used to host a second Internet website (e.g., www.google.com); and, the web server C indicated by reference numeral 158 may be assigned an IP address of 3.3.3.3 and used to host a third Internet website (e.g., www.facebook.com).

The client 170 may be a computing device that includes a memory and a processor, for example a laptop computer, a desktop computer, a tablet computer, a mobile telephone, a personal digital assistant (PDA), a mobile email device, a portable game player, a wireless bar code scanner, a portable music player, a reader device, a television with one or more processors embedded therein or coupled thereto or other electronic device capable of accessing a network. Although only one client 170 is illustrated in FIG. 1, it should be recognized that a plurality of clients 170 can be included in FIG. 1.

Network Device/System (Wideband Frequency Spectrum Analyzer)

Figure 2:
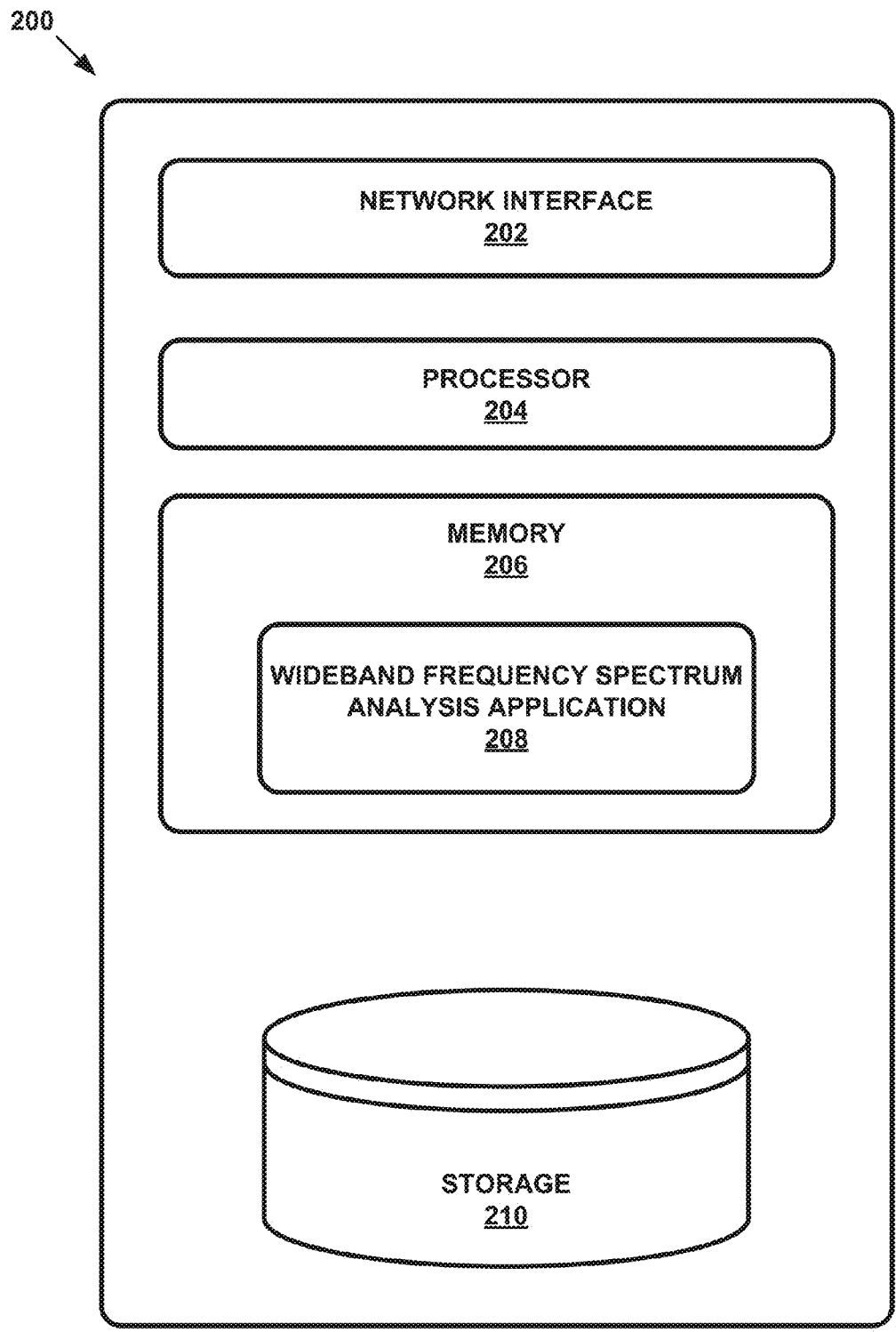
FIG. 2 is a block diagram illustrating an example network device or system for dynamically modifying scanning methods and/or configurations or adaptive scanning of frequency channels of variable widths, according to some embodiments of the present disclosure.

FIG. 2 is a block diagram illustrating an example network device or system 200 for adaptively scanning variable-width channels to capture wideband spectrum data according to some embodiments of the present disclosure. The network device or system 200 may be used as a network switch, a network router, a network controller, a network server, an access point (AP), etc. For example, the network device or system 200 may be an access point or a controller that is communicatively coupled by one or more clients (or stations). Further, the network device 200 may serve as a node in a distributed or a cloud computing environment.

According to embodiments of the present disclosure, network services provided by the network device or system 200, solely or in combination with other wireless network devices, include, but are not limited to, an Institute of Electrical and Electronics Engineers (IEEE) 802.1x authentication to an internal and/or external Remote Authentication Dial-In User Service (RADIUS) server; a MAC authentication to an internal and/or external RADIUS server; a built-in Dynamic Host Configuration Protocol (DHCP) service to assign wireless client devices IP addresses; an internal secured management interface; Layer-3 forwarding; Network Address Translation (NAT) service between the wireless network and a wired network coupled to the network device; an internal and/or external captive portal; an external management system for managing the network devices in the wireless network; etc. In some embodiments, the network device or system 200 may serve as a node in a distributed or a cloud computing environment.

In some embodiments, the network device or system 200 includes at least one network interface 202 capable of communicating to a wired network, a processor 204, a memory 206 and a storage device 210. The components of the network device or system 200 are communicatively coupled to each other.

The network interface 202 can be any communication interface for coupling network devices, which includes but is not limited to, a modem, token ring interface, Ethernet interface, wireless IEEE 802.11 interface (e.g., IEEE 802.11n, IEEE 802.11ac, etc.), cellular wireless interface, satellite transmission interface, or any other interface for coupling network devices. In some embodiments, network interface 202 may be software-defined and programmable, for example, via an Application Programming Interface (API), and thus allowing for remote control of the network device 200.

The processor 204 includes an arithmetic logic unit, a microprocessor, a general purpose controller or some other processor array configured to perform computations and provide electronic display signals to a display device. The processor 204 processes data signals and may include various computing architectures including a complex instruction set computer (CISC) architecture, a reduced instruction set computer (RISC) architecture, or an architecture implementing a combination of instruction sets. Although FIG. 2 illustrates only a single processor 204, multiple processors 204 may be used. Other processors, operating systems, sensors, displays and physical configurations are also possible. In some embodiments, the processor 204 includes a networking processor core that is capable of processing network data traffic.

The memory 206 stores instructions and/or data that may be executed by the processor 204. The instructions and/or data may include code for performing the techniques described herein. The memory 206 may be a dynamic random access memory (DRAM) device, a static random access memory (SRAM) device, flash memory or some other memory device. In some embodiments, memory 206 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some embodiments, a wideband frequency spectrum analysis application 208 is stored in memory 206. The wideband frequency spectrum analysis application 208 can be the code and routines that, when executed by processor 204, cause the network device 200 to implement scanning of a wideband spectrum of channels of different or varying width to capture wideband spectrum data. In some embodiments, the memory 208 stores a wideband frequency spectrum analysis application 208. The wideband frequency spectrum analysis application 208 can be code and routines for performing adaptive scanning of a wideband spectrum of frequency channels, based on determining levels of Wi-Fi activity and presence or expectation of interference from other sources. In some embodiments, the wideband frequency spectrum analysis application 208 may identify any particular type of signal that is of interest. In some instances, this particular type of signal may reflect an interfering signal causing intrusion in the wireless digital network. In some instances, the particular type of signal may reflect a Wi-Fi signal from an adjacent network. In some instances, this particular type of signal may reflect any other signal of interest to a system administrator. In some embodiments, the wideband frequency spectrum analysis application can be located in an access point 160. In some other embodiments, the wideband frequency spectrum analysis application can be located in a controller 100, a router 120, a gateway 130, a switch or any other network device. In some embodiments, the wideband frequency spectrum analysis application 208 can be implemented using hardware including a field-programmable gate array (FPGA) or an application-specific integrated circuit (ASIC). In some other embodiments, the wideband frequency spectrum analysis application 208 can be implemented using a combination of hardware and software. In some embodiments, the wideband frequency spectrum analysis application 208 may be stored either in a combination of the network devices, or in one of the network devices. The wideband frequency spectrum analysis application 208 is described below in more detail with reference to FIGS. 3-10.

The storage device 210 may be a non-transitory memory that stores data for providing the functionality described herein. The storage device 210 may be a dynamic random access memory (DRAM) device, a static random access memory (SRAM) device, flash memory or some other memory devices. In some embodiments, storage device 210 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

Figure 3:
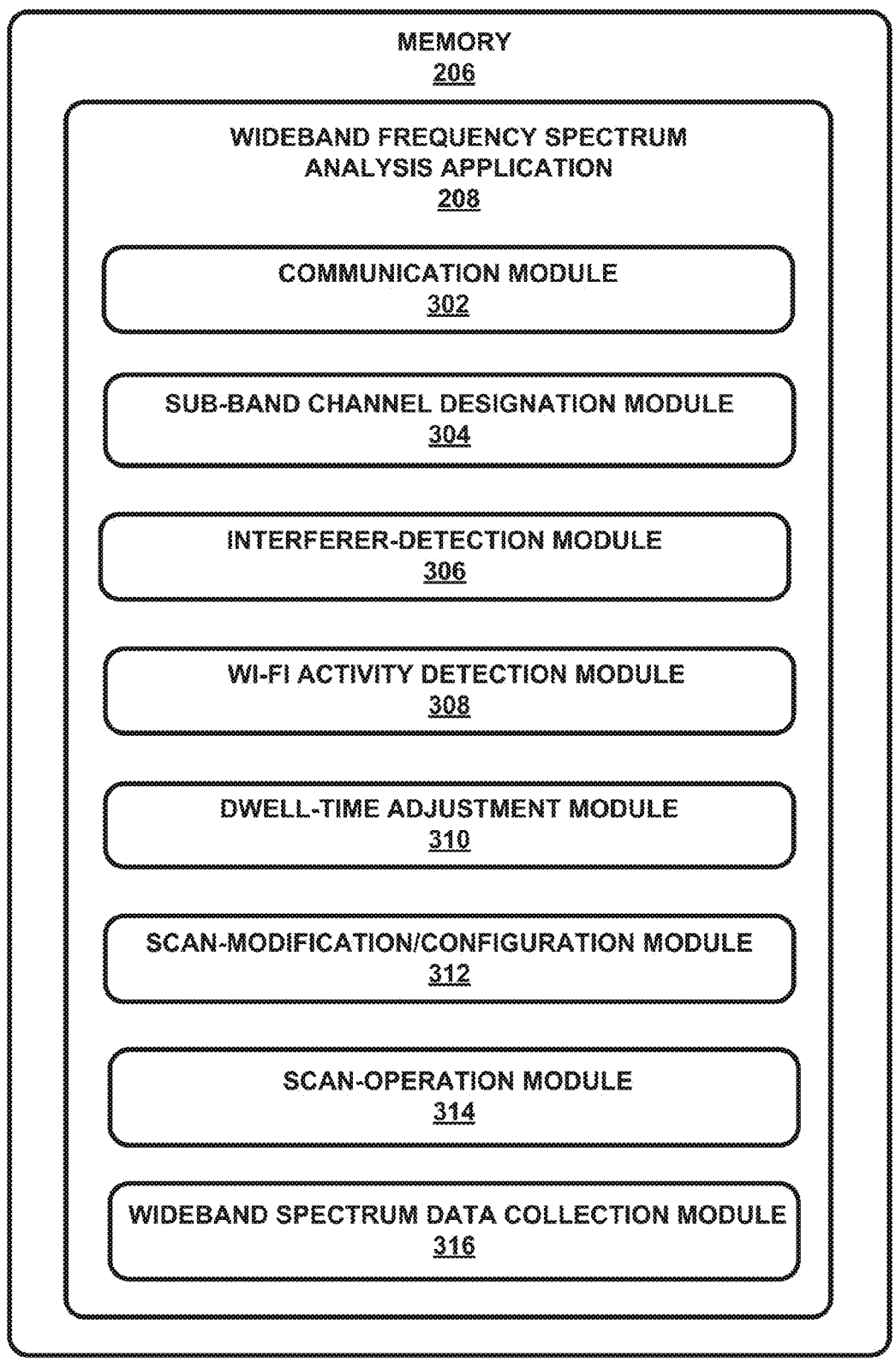
FIG. 3 is a block diagram illustrating an example wideband spectrum analysis application according to some embodiments of the present disclosure. The application is stored on a memory of the example network device or system.

FIG. 3 is a block diagram illustrating an exemplary wideband frequency spectrum analysis application 208 stored in memory 206 according to some embodiments of the present disclosure. In some embodiments, the wideband frequency spectrum analyzer application 208 includes a communication module 302, a sub-band channel designation module 304, an interferer-detection module 306, a Wi-Fi activity detection module 308, a scan dwell-time adjustment module 310, a scan-modification/configuration module 312, a scan-operation module 314, and a wideband spectrum data collection module 316. In some embodiments, each module of the wideband frequency spectrum analyzer application 208 can be a set of instructions executable by the processor 204 to provide the functionality described herein. In some other embodiments, each module of the wideband frequency spectrum analyzer application 208 can be stored in the memory 206 of the network device in which it is located and can be accessible and executable by the processor 204. Each module of the wideband frequency spectrum analyzer application 208 may be adapted for cooperation and communication with the processor 204 and other components of the wideband frequency spectrum analyzer application 208 such as the network interface 202, the storage 210, etc.

The communication module 302 can be software including routines for handling communications between the wideband frequency spectrum analyzer application 208 and other components in the digital computing environment 199 (FIG. 1). In some embodiments, the communication module 302 can be a set of instructions executable by the processor 204 to provide the functionality described herein. In some other embodiments, the communication module 302 can be stored in the memory 206 of the wideband frequency spectrum analyzer application and can be accessible and executable by the processor 204.

In some embodiments, the communication module 302 may be adapted for cooperation and communication with the processor 204 and other components of the wideband frequency spectrum analyzer application 208 such as the network interface 202, the storage 210, etc.

In some embodiments, the communication module 302 sends and receives data to and from one or more of a client 170 (FIG. 1), an access point 160 (FIG. 1) and other network devices via the network interface 202 (FIG. 2), in the event of distributed functionalities.

In some embodiments, the communication module 302 handles communications between components of the wideband spectrum analyzer application 208.

In some embodiments, the communication module 302 receives data from other components of the wideband frequency spectrum analyzer application 208 and stores the data in the storage device 210. For example, the communication module 302 may receive data describing a controller's TX count and RX count associated with an access point 160 and stores the controller's TX count and RX count in the storage device 210.

In some embodiments, the communication module 302 retrieves data from the storage device 210 and sends the data to other components of the wideband frequency spectrum analyzer application 308. For example, the communication module 302 retrieves data to designate sub-band selections within a frequency spectrum, designate alternating primary and secondary selection of particular channels, and/or designate variable dwell times, levels of Wi-Fi activity and modification of scanning algorithms.

The sub-band designation module 304 can be software including routines for the wideband frequency spectrum analyzer 208 to either segment or partition the wideband spectrum into sub-bands to facilitate covering the entire wideband with multiple scans or passes. In some embodiments, the wideband frequency spectrum analyzer application 208 may be located in each access point (or other radio network device) 160 to perform adaptive scanning operations. In some embodiments, the sub-band designation module 304 can be a set of instructions executable by the processor 204 to provide the functionality described herein. In some other embodiments, the sub-band designation module 304 can be stored in the memory 206 of the wideband frequency spectrum analyzer application and can be accessible and executable by the processor 204. In some embodiments, the sub-band designation module 304 may be adapted for cooperation and communication with the processor 204 and other components of the wideband frequency spectrum analyzer application 208 such as the network interface 202, the storage 210, etc. In some embodiments, the sub-band designation module 304 designates either splitting or partitioning of the spectrum of frequency channels into segments for performing multiple scan passes that may be modified depending upon criteria that is determined. The segments include contiguous and non-contiguous segments. For example, the sub-band designation module can configure a 40 MHz spectrum of channels, by defining a portion of the spectrum, as the primary channel. For example, the first 20 MHz channels may be designated as the primary channel and the second 20 MHz channels may be designated as the secondary channel, or vice versa. The primary channel generally refers to the channel used for transmissions at its native bandwidth. For each channel bandwidth, there is one primary channel, meaning that it is the channel used to transmit frames at that channel width. For example, considering eight 20 MHz contiguous segments from channel 36, 40, 44, 48, 52, 56, 60, and 64, to transmit a 20 MHz frame on a 20 MHz primary channel (e.g., channel 60), channel 60 must be free and the network will transmit 20 MHz frames on channel 60. To transmit a 40 MHz frame on its 40 MHz primary channel, both channels 60 and 64 must be free. To transmit an 80 MHz frame, the four channels 52 through 64 must all be free. Finally, to transmit a 160 MHz frame, all eight channels from 36 through 64 must be free. The notion of primary and secondary channels helps multiple networks to share the same frequency space. Due to the wide variety of devices and data rates in use, a network that is designed for peak speed using 160 MHz channels will not always need the full capacity of the channel. Two networks may share the same 160 MHz channel. They may both transmit 80 MHz frames at the same time because their primary 80 MHz channels are different.

By this partitioning of the wideband spectrum of frequency channels, appropriate scanning algorithms are executed for each segment, not only to effectively scan the entire band of channels in the spectrum, but also to address the myriad limitations of conventional wireless receivers that are customary. For example, in some instances, conventional wireless radios when using a 40 MHz channel, may not be able to receive 20 MHz Wi-Fi traffic on the secondary 20 MHz channel. As another example, in some instances, conventional wireless radios may also not be able to receive 40 MHz Wi-Fi frames with a different primary/secondary channel. Similar issues may also be present in 80 MHz and 160 MHz channels. In some instances, when a narrowband interferer is present on the secondary 20 MHz channel of a 40 MHz channel, channel parameters such as noise floor, channel utilization, and signal strength of the interferer may be incorrectly determined simply because the radio cannot detect interferers on the secondary channel with ease. Similar issues may also be present in 80 MHz and 160 MHz channels.

The interferer detection module 306 can be software including routines for detecting interferer signals in the channels that are being scanned. In some embodiments, the interferer module 306 can be a set of instructions executable by the processor 204 to provide the functionality described herein. In some other embodiments, the interferer module 306 can be stored in the memory 206 of the wideband spectrum analyzer and can be accessible and executable by the processor 204. In some embodiments, the interferer detection module 306 may be adapted for cooperation and communication with the processor 204 and other components of the wideband spectrum analyzer 208 such as the network interface 202, the storage 210, etc.

In some embodiments, the interferer detection module 306 determines if there are any interference signals, in particular frequency channels or segments of the frequency channels that are being scanned, as identified by the sub-band designation module 304. For example, in some embodiments, the interferer detection module 306 determines if there are any interfering signals created either intermittently or continuously, by the presence of non-network devices, for example, radio-frequency devices that are not a part of the digital wireless network. Examples of these types of non-network radio-frequency device may be microwave ovens, wireless video streaming devices, cordless phones, and the like, as well as other adjacent wireless networking devices.

In some embodiments, the interferer detection module 306 may determine if there is no non-interferer presence, by indicating the absence of interference. In some embodiments, the interferer detection module 306 may determine if interference is expected. In the event non-interferer presence is neither detected nor expected, dwell times may be adjusted accordingly.

The Wi-Fi activity detection module 308 can be software including routines for detecting the amount or level or Wi-Fi activity that is either expected or present within particular frequency channels or particular segments of the wideband frequency spectrum as identified by the sub-band designation module 304. In some embodiments, the Wi-Fi activity detection module 308 can be a set of instructions executable by the processor 204 to provide the functionality described herein. In some other embodiments, the Wi-Fi activity detection module 308 can be stored in the memory 206 of the wideband spectrum analyzer and can be accessible and executable by the processor 204. In some embodiments, the Wi-Fi activity detection module 308 may be adapted for cooperation and communication with the processor 204 and other components of the wideband spectrum analyzer 208 such as the network interface 202, the storage 210, etc.

The Wi-Fi activity detection module 308 determines levels of Wi-Fi activity. In some embodiments, the levels of Wi-Fi activity are based on present Wi-Fi activity that is detected in the segments of the frequency channels that are designated for scanning by the sub-band designation module 304. In some embodiments, the Wi-Fi activity detection module 308 may determine expected levels of Wi-Fi activity. By determining either the actual levels of Wi-Fi activity or the expected levels of Wi-Fi activity, dwell times for scanning operations can be adjusted. In some embodiments, levels of Wi-Fi activity may be determined by considering a threshold level of Wi-Fi activity and determining if the level detected or determined exceeds this threshold level. Alternatively, other ways to determine a level of Wi-Fi activity may also be used. It should be recognized that Wi-Fi-activity may reflect Wi-Fi channel utilization, number of APs, number of clients, presence of a rogue AP, too many error packets indicating presence of a Wi-Fi transmitter with signals that cannot be deciphered, too many Wi-Fi retry packets, too many Wi-Fi checksum error packets etc. In the event the level of Wi-Fi activity is high or low, the dwell times for scan operations are adjusted. Once the dwell times are adjusted, a scan operation is started, with each pass sweeping the designated channels in the spectrum according to the variable dwell times determined.

The dwell-time adjustment module 310 can be software including routines for either designating or adjusting suitable dwell-times for scanning operations of channels with varying or different widths. In some embodiments, the dwell-time adjustment module 310 can be a set of instructions executable by the processor 204 to provide the functionality described herein. In some other embodiments, the dwell-time adjustment module 310 can be stored in the memory 206 of the wideband spectrum analyzer and can be accessible and executable by the processor 204. In some embodiments, the dwell-time adjustment module 310 may be adapted for cooperation and communication with the processor 204 and other components of the wideband spectrum analyzer 208 such as the network interface 202, the storage 210, etc.

In some embodiments, the dwell-time adjustment module 310 makes adjustments to dwell times for scan operations. Once the dwell times are adjusted, a scan operation is started, with each pass sweeping the designated channels in the spectrum according to the variable dwell times determined. The dwell times may be adjusted or designated to allow varying amounts of time spent at different channels or segments, as designated by the sub-band designation module 304. As one example, the dwell-time adjustment module 310 may designate 100 msec for an upper band, 75 msec for a lower/mid band, and 50 msec for a 50 MHz frequency channel. It should be recognized that the dwell-time adjustment module 310 may dynamically adjust these dwell times based on detection on interferer and Wi-Fi activity levels.

In some embodiments, when a fixed-time interval is accorded by scanning operations, this fixed-time interval is divided into variable dwell times for scanning various segments of the frequency channels as designated by the sub-band module 304.

The scan-modification/configuration module 312 can be software including routines for modifying the algorithms used in the scan operations based upon detecting interferer or levels of Wi-Fi activity or other criteria that may be specified. In some embodiments, the scan-modification module 314 can be a set of instructions executable by the processor 204 to provide the functionality described herein. In some other embodiments, the scan-modification module 314 can be stored in the memory 206 of the wideband spectrum analyzer and can be accessible and executable by the processor 204. In some embodiments, the scan-modification module 304 may be adapted for cooperation and communication with the processor 204 and other components of the wideband spectrum analyzer 208 such as the network interface 202, the storage 210, etc.

The scan-modification/configuration module 312 adaptively modifies algorithms that may be used for capturing data, depending on evaluating the type and strength of interfering signals that are either detected or expected to be present in a particular channel. In some embodiments, these algorithms designate predetermined or fixed periods of time for scanning operations, for example, a few seconds, in order to determine and collect data, for example signal strength, utilization of channel, and interference power ("ACI"—adjacent channel interference). These algorithms may be modified to perform scanning operations that include splitting or partitioning the frequency channel spectrums (contiguous or non-contiguous). In some embodiments, the scan-modification/configuration module 312 modifies scans to perform multiple passes, depending upon criteria determined with each pass.

In some embodiments, the scan-modification module can assess and determine the capability of a particular access point (AP) 160 (FIG. 1). As one example, the sub-band designation module 304 configures a 40 MHz spectrum of channels, by first defining a portion of the wideband frequency spectrum, as the primary channel. For example, the sub-band designation module 304 designates the first 20 MHz channels as the primary channel and the second 20 MHz channels as the secondary channel, or vice versa. In some embodiments, the scan-modification/configuration module 312 selects an appropriate scanning algorithm to effectively scan the entire band of channels in the spectrum. In some embodiments, the scan-modification/configuration module 312 selects an appropriate scanning algorithm to address the myriad limitations of conventional wireless receivers, some of which are described above.

The scan-operation module 314 can be software including routines for initiating or performing various scan operations, either the first, second or other scan operations. In some embodiments, the scan-operation module 314 can be a set of instructions executable by the processor 204 to provide the functionality described herein. In some other embodiments, the scan-operation module 314 can be stored in the memory 206 of the wideband spectrum analyzer and can be accessible and executable by the processor 204. In some embodiments, the scan-operation module 314 may be adapted for cooperation and communication with the processor 204 and other components of the wideband spectrum analyzer 208 such as the network interface 202, the storage 210, etc.

In some embodiments, the scan-operations module 314 performs multiple scan operations configured to scan the entire band of frequency channels in multiple passes to capture wideband spectrum data. The scan-modification/configuration module 312 adaptively modifies the algorithms used for data collection depending on the type and signal strength of the interferers that are present in a particular channel. In some embodiments, the scan-operations module 314 completes a sweep of the spectrum in a predetermined or fixed period of time, for example, a few seconds, in order to capture data, for example, signal strength, utilization of channel, and interference power ("ACI"—adjacent channel interference). The scan-operations use scanning operations that include scanning split, partitioned, or segmented spectrum of frequency channels, and performing multiple scan passes, depending upon criteria determined with each scan pass.

In some embodiments, depending upon the capability of a particular access point (AP) 160 (FIG. 1), the scan-operation module 314 scans designated frequency channels. As one example, the scan-operation module scans either primary or secondary channels as designated, with appropriate scanning algorithm. In some embodiments, In some embodiments, the scan-operation module 314 alternates scans of primary and secondary channels selected to cover the entire spectrum, by making multiple passes. In order to stay within the dwell times that are allocated, the scan-operation module makes each pass consistent with the dwell times that are designated. In some embodiments, the scan-operation module 324 scans according to algorithms identified by the scan-modification/configuration module 312, based on the levels of Wi-Fi activity that is determined or presence of interfering signals.

In some embodiments, the wideband spectrum data collection module 316 can be software including routines for collecting data from the various adaptive scans of the segments designated. The data captured from these adaptive scans may be combined.

In some embodiments, the wideband spectrum data collection module 316 can be a set of instructions executable by the processor 204 to provide the functionality described herein. In some other embodiments, the wideband spectrum data collection module 316 can be stored in the memory 206 of the wideband spectrum analyzer and can be accessible and executable by the processor 204. In some embodiments, the wideband spectrum data collection module 316 may be adapted for cooperation and communication with the processor 204 and other components of the wideband spectrum analyzer 208 such as the network interface 202, the storage 210, etc.

In some embodiments, spectrum data is collected by one or more network devices or radios in a network, such as access points (APs), controllers, or from suitably equipped client devices. Spectrum data may be combined on a device producing a wideband spectrum, or may be sent in combined or uncombined form, to another device designated for combining into a wideband spectrum according to the processes that are described here. As an example, samples from internet devices (radios) are combined for display on a computer. In some embodiments, samples from APs that are located proximate each other may be combined to provide estimates of the wideband spectrum in a particular area. In some embodiments, these data samples may be combined with additional data samples from suitable client devices in the area. Such data samples may be stored for later combination and analysis.

Wideband Spectrum Analysis Application

FIGS. 4-10 are directed to process flows that illustrate example methods and techniques utilized by the wideband spectrum analysis application 208 for performing multiple scan operations configured to scan the entire band of channels in multiple passes to collect wideband spectrum data. The wideband spectrum analysis application 208 adaptively modifies the algorithms used for data collection depending on the type and signal strength of the interferers that are present in a particular channel. In some embodiments, the wideband spectrum analyzer 208 is configured to complete a sweep of the spectrum in a predetermined or fixed period of time, for example, a few seconds, in order to determine and collect data, for example signal strength, utilization of channel, and interference power ("ACI"—adjacent channel interference). The wideband spectrum analysis application 208 uses scanning operations that include splitting or partitioning the spectrum of channels, and performing multiple passes, depending upon criteria determined with each pass. First, the methods assess and determine the capability of a particular access point (AP) 160 (FIG. 1). As one example, a 40 MHz spectrum of channels can be configured, by first defining a portion of the spectrum, as the primary channel, for example, the first 20 MHz channels as the primary channel and the second 20 MHz channels as the secondary channel, or vice versa. The wideband spectrum analysis application 208 selects an appropriate scanning algorithm not only to effectively scan the entire band of channels in the spectrum, but also to address the myriad limitations of conventional wireless receivers. In some instances, conventional wireless radios when using a 40 MHz channel, may not be able to receive 20 MHz Wi-Fi traffic on the secondary 20 MHz channel. In some instances, conventional wireless radio may also not be able to receive 40 MHz Wi-Fi frames with a different primary/secondary channel. Similar issues are also present in 80 MHz and 160 MHz channels. In some instances, when a narrowband interferer is present on the secondary 20 MHz channel of a 40 MHz channel, channel parameters such as noise floor, channel utilization, and signal strength of interferers may be incorrectly determined simply because the radio cannot detect interferers on the secondary channel with ease. Similar issues are also present in 80 MHz and 160 MHz channels.

Figure 4:
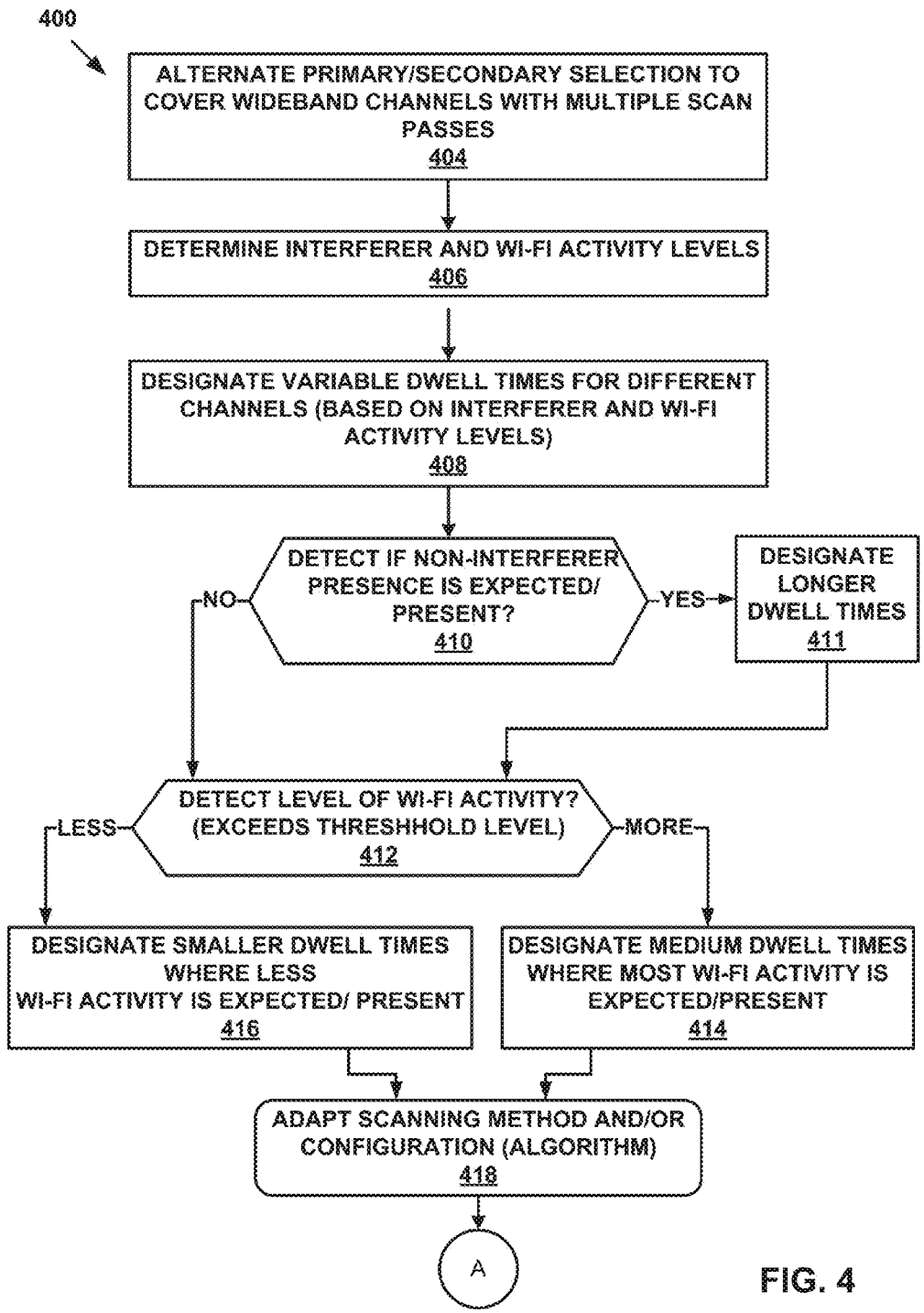
FIG. 4 illustrates an example general process flow for modifying scanning operations (and underlying algorithms) used by the wideband spectrum analysis application according to some embodiments of the present disclosure. The scanning operations are configured to cover wideband frequency channels, with multiple scan passes over channel segments or sub-bands.

FIG. 4 is a flowchart illustrating an exemplary process 400 for scanning of variable width channels to generate wideband spectrum data according to embodiments of the present disclosure. Specifically, FIG. 4 illustrates an exemplary process 400 for scanning of variable width channels to generate wideband spectrum data, in which the full spectrum is effectively covered yet in the fixed time intervals allocated. During operation, the disclosed system alternates selection of primary and secondary channels (contiguous or non-contiguous), across scans, to cover the entire spectrum, by making multiple passes (one or more operations indicated by block 402). In order to stay within the dwell times that are allocated, the system determines and adjusts the dwell times based on the levels of Wi-Fi activity that is determined or presence of interferer signals (one or more operations indicated by block 404). The levels of Wi-Fi activity may be based on present Wi-Fi activity that is determined or expected levels of Wi-Fi activity. For example, the system may estimate the expected level of Wi-Fi activity. The system operations designate variable dwell times for different channels (or segments), based on interferer and Wi-Fi activity levels (one or more operations indicated by block 408) to cover all the channels in the spectrum. These operations include making a determination of whether non-interferer presence is either detected or expected (one or more operations indicated by decision block 410). In the event non-interferer presence is detected or expected, longer dwell times are designated (one or more operations indicated by block 411). In the event non-interferer presence is not detected or expected to be present, a level of Wi-Fi activity is determined or detected (one or more operations indicated by block 412). Also, after designating longer dwell times and adjusting accordingly, the disclosed system proceeds to block 412. In some embodiments, this may be determined by considering a threshold level of Wi-Fi activity and if the level detected or determined exceeds this threshold level. Alternatively, other ways to determine a level of Wi-Fi activity may also be used. In the event the level of Wi-Fi activity that is detected is more, medium dwell times are designated (one or more operations indicated by block 414). Yet, in the event, the level of Wi-Fi activity that is detected is less, smaller dwell times are designated (one or more operations indicated by block 416). Once the dwell times are adjusted, an adaptive scan operation, method, or configuration (algorithm) is started (one or more operations indicated by block 418), with each pass sweeping the designated channels in the spectrum according to the variable dwell times determined. As one example, the dwell times may be adjusted, wherein 100 msec is accorded for an upper band, 75 msec is accorded for a mid band, and 50 msec for a lower band. It should be recognized that these dwell times are dynamically adjusted based on detection of interferer and Wi-Fi activity levels. FIG. 4 connects to FIG. 5 via a connector A.

Figure 5:
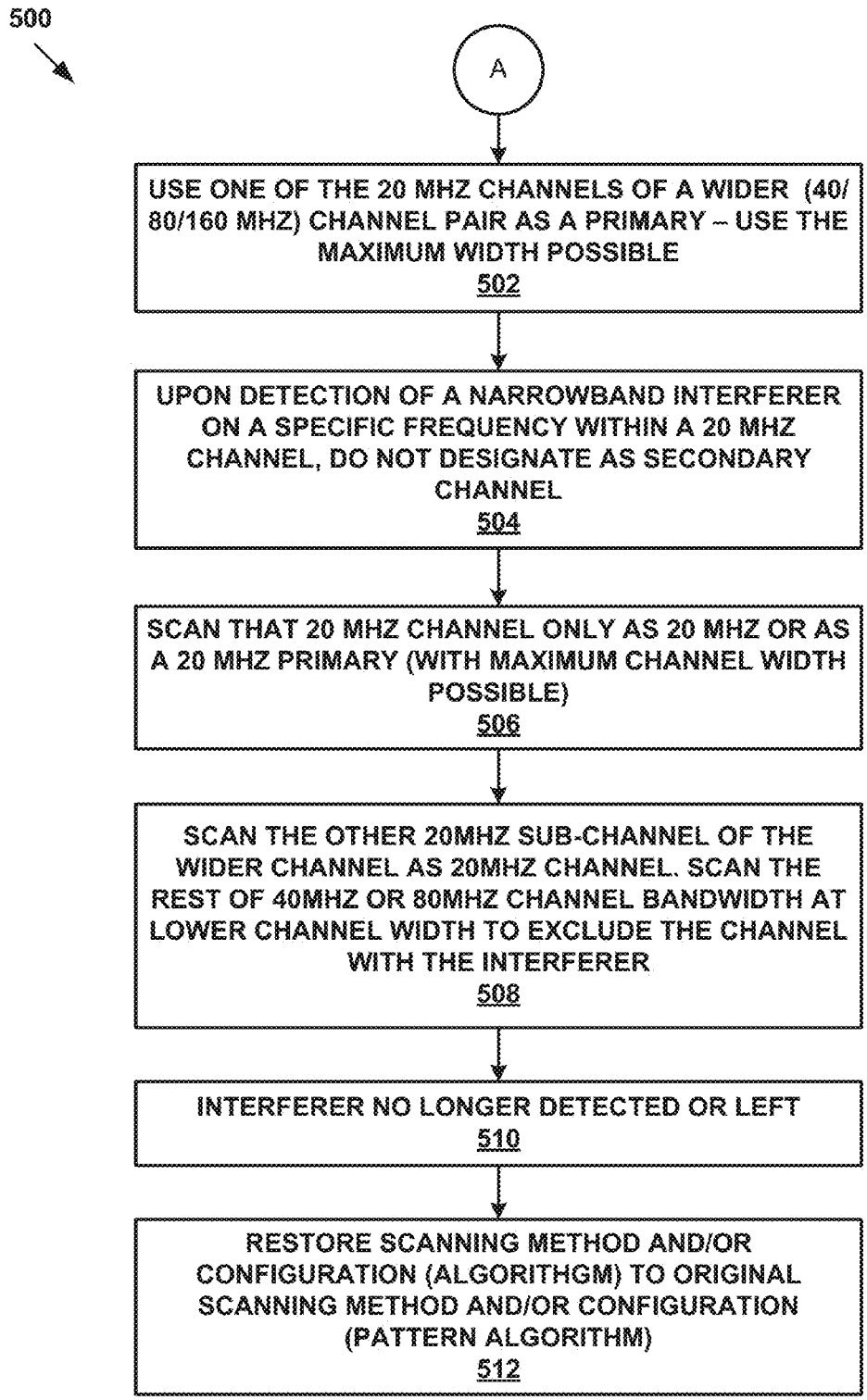
FIG. 5 illustrates additional parts of the example general process flow illustrated in FIG. 4.

FIG. 5 is a flowchart illustrating an exemplary process 500 for performing a scan according to some embodiments of the present disclosure. During operation, the disclosed system uses one of the 20 MHz channels of a wider spectrum with (40/80/160) channel pairs as the primary (one or more operations as indicated by block 502). The system uses the maximum channel width that is possible. When a narrow-band interferer is detected on a specific frequency within a 20 MHz channel, the disclosed system does not designate it as a secondary channel (one or more operations indicated by block 504). The system scans that 20 MHz channel only as a 20 MHz channel or as primary 20 MHz with maximum channel width possible (one or more operations indicated by block 506). The system scans the other 20 MHz sub-channels of the wider channel as 20 MHz channels and the remaining ones of the 40 MHz or 80 MHz channel bandwidth at lower channel widths to exclude the channel where the interferer is either detected or expected to be present (one or more operations also indicated by block 508). Once the interferer is no longer detected or has left (one or more operations indicated by block 510), the system restores the scanning method, operation, or configuration to its original pattern of scanning (one or more operations indicated by block 512).

FIG. 6 is a flowchart illustrating an exemplary process 600 according to some embodiments of the present disclosure. Specifically, FIG. 6 illustrates an exemplary process configured to sweep the entire 5 GHz spectrum or band of channels with two scan passes, within a fixed time allocated, with each 20 MHz channel scanned as a primary channel (one or more operations indicated by block 602). During operation, the disclosed system, in one scan pass, scans each 40 MHz channel with designating and using the lower 20 MHz channel as the primary 20 MHz channel (one or more operations indicated by block 604). In the first scan pass, the system also scans all 20 MHz only channels (one or more operations indicated by block 606). In some embodiments, examples include the channels 140, 165. The disclosed system in the next or second scan pass scans the 40 MHz channels with the designating the upper 20 MHz channel as the primary 20 MHz channel (one or more operations indicated by block 608). In the second scan pass, the disclosed system also scans the 20 MHz only channels (one or more operations indicated by block 610). Accordingly, the disclosed system, in some embodiments, uses two scan passes, to cover the entire 5 GHz spectrum, with each 20 MHz channel scanned as a primary channel. FIG. 6 connects to FIG. 7 via a connector B.

Figure 7:
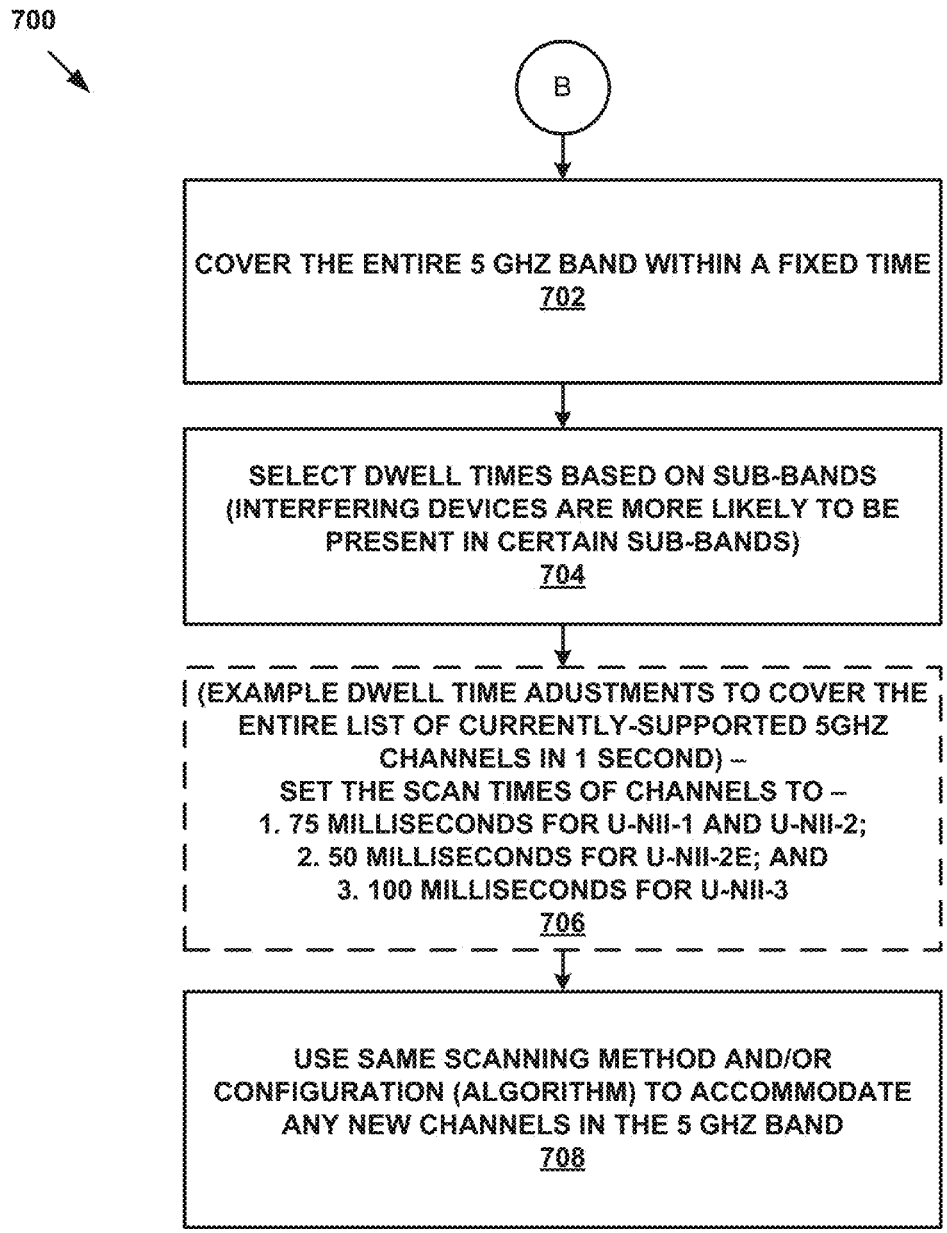
FIG. 7 illustrates additional parts of the example process flow illustrated in FIG. 6.

FIG. 7 is a flowchart illustrating an exemplary process 700 to select dwell times based on sub-bands according to some embodiments of the present disclosure. Specifically, the disclosed system covers the entire 5 GHz band within a fixed time (one or more operations indicated by block 702). The disclosed system selects or chooses the dwell times based on sub-bands because interfering devices are more likely to be present in certain sub-bands (one or more operations indicated by block 704). In some embodiments, for example, to cover the entire list of currently supported 5 GHz channels in 1 second, the disclosed system adjusts the scan times of channels to 75 milliseconds for U-NII-1 and U-NII-2; 50 milliseconds for U-NII-2e, and 100 milliseconds for U-NII-3 (one or more operations indicated by block 706). The block 706 is illustrated by broken lines, as the dwell time adjustments indicated are only by way of example. The same scanning method, operation, or configuration (and underlying algorithm) can be extended to accommodate newer channels that are currently being opened up by the FCC in the 5 GHz band (one or more operations indicated by block 708).

Figure 8:
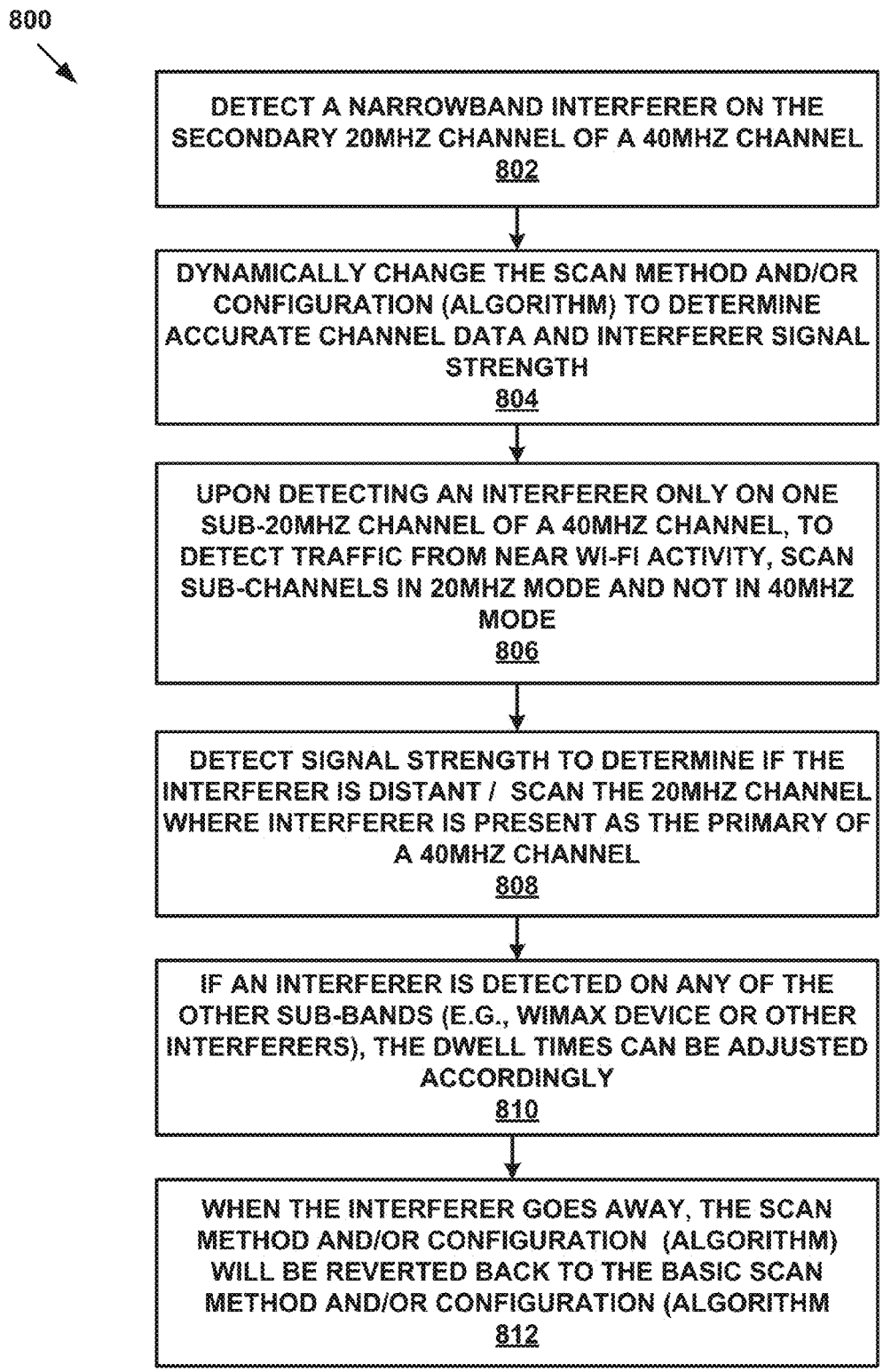
FIG. 8 is an example process flow illustrating an adaptive scanning operation (and underlying algorithm), according to some embodiments of the present disclosure, for use with a 5 GHz frequency spectrum.

FIG. 8 is a flowchart illustrating an exemplary process 800 for using an adaptive scanning algorithm in 5 GHz according to some embodiments of the present disclosure. Specifically, the disclosed system is configured to detect that a narrowband interferer is present on the secondary 20 MHz channel of a 40 MHz channel (one or more operations indicated by block 802). Upon detecting the narrowband interferer, the disclosed system modifies the scan algorithm (or configuration) dynamically to obtain accurate channel data and interferer signal strength (one or more operations indicated by block 804). Upon detecting an interferer only on one sub-20 MHz channel of a 40 MHz channel, to detect traffic from near Wi-Fi activity, the disclosed system scans sub-channels in the 20 MHz mode and not in the 40 MHz mode (one or more operations indicated by block 806). The disclosed system detects or determines that the interferer is far away by detecting the signal strength. It should be recognized that in some instances, Wi-Fi devices can still sustain 40 MHz data at certain data rates. To detect this traffic, the 20 MHz channel where the interferer is present is scanned as the primary channel of a 40 MHz channel (one or more operations indicated by block 808). In the instance that an interferer is detected on any of the other sub-bands, the disclosed system adjusts the dwell times accordingly (one or more operations indicated by block 810). As examples, in some embodiments, the disclosed system may detect interferers, for example, because of a WiMax device or because of other known interferers. In some embodiments, when the disclosed system detects that the interferer is excluded or has otherwise gone away, the disclosed system modifies the scan method, configuration (or algorithm), by reverting the adaptive algorithm to the basic algorithm (one or more operations indicated by block 812).

Figure 9:
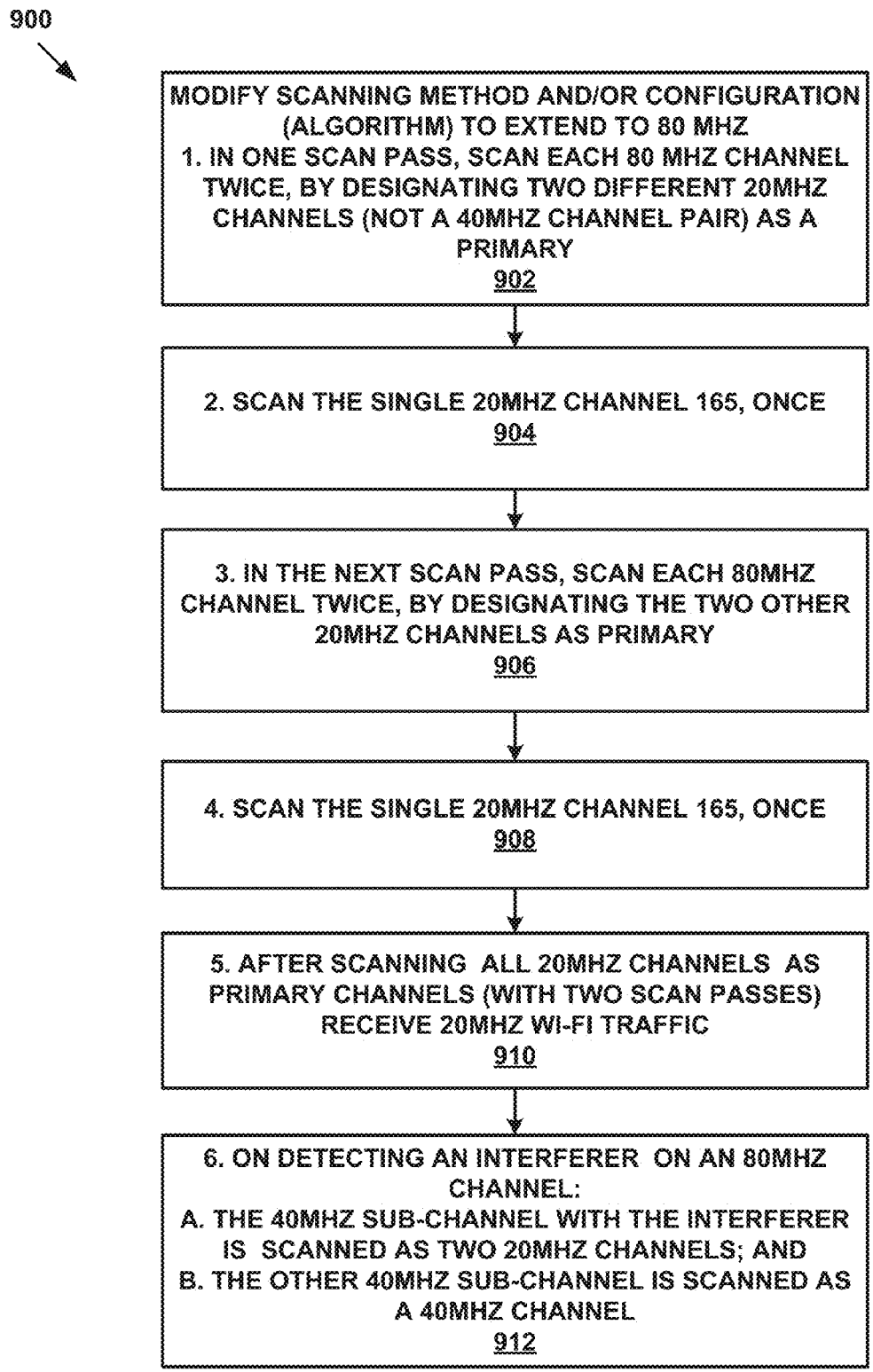
FIG. 9 is an example process flow illustrating adaptive scanning operations that are modified (algorithms), according to some embodiments of the present disclosure, for use with 80 MHz frequency channels.

FIG. 9 is a flowchart illustrating an exemplary process 900 for extending the adaptive scanning operations or modifying the scanning method and/or configurations to 80 MHz. The disclosed system, in one scan pass, scans each 80 MHz channel twice, with two different 20 MHz channels (that cannot be a 40 MHz channel pair) as the primary 20 MHz channel (one or more operations indicated by block 902). The disclosed system, then scans the single 20 MHz channel 165 once (one or more operations indicated by block 904). The disclosed system, in the next scan pass, scans each 80 MHz channel twice, with designating the two other 20 MHz channels as primary 20 MHz channels (one or more operations indicated by block 906). The disclosed system, in this scan pass, scans the single 20 MHz channel 165 once (one or more operations indicated by block 908). By these two scan passes, the disclosed system scans all 20 MHz channels as primary channels to receive all the 20 MHz Wi-Fi traffic (one or more operations indicated by block 910). The disclosed system, upon detecting an interferer on an 80 MHz channel, scans the particular 40 MHz sub-channel which has the interferer as two 20 MHz channels and the other 40 MHz sub-channel as a 40 MHz channel (one or more operations indicated by block 912).

FIG. 10 is a flowchart illustrating an exemplary process 1000 for extending the adaptive scanning operations or modifying the scanning methods and/or configurations to 160 MHZ and 80+80 MHz channels. The disclosed system, scans the two 160 MHz channels (36-64 and 100-128) and the 80+80 MHz (132-144+149-161) channel and the 20 MHz channel 165 (one or more operations indicated by block 1002). The disclosed system, in a scan pass, scans the 160 MHz channel four times with designating one of the 20 MHz sub-channels of a 40 MHz channel as the primary one (one or more operations indicated by block 1004). In the next scan pass, the disclosed system uses the other 20 MHz sub-channel as primary of the 160 MHz channel (one or more operations indicated by block 1006). The disclosed system does the same for the 80+80 MHz channel, by scanning it four times in a scan pass with four different 20 MHz channels designated as primary channels, each of the 20 MHz channels belonging to a 40 MHz channel (one or more operations indicated by block 1008).

The present disclosure may be realized in hardware, software, or a combination of hardware and software. The present disclosure may be realized in a centralized fashion in one computer system or in a distributed fashion where different elements are spread across several interconnected computer systems coupled to a network. A typical combination of hardware and software may be an access point with a computer program that, when being loaded and executed, controls the device or system such that it carries out the methods described herein.

The present disclosure also may be embedded in non-transitory fashion in a computer-readable storage medium (e.g., a programmable circuit; a semiconductor memory such as a volatile memory, e.g., a random access memory "RAM," or non-volatile memory such as read-only memory, power-backed RAM, flash memory, phase-change memory or the like; a hard disk drive; an optical disc drive; or any connector for receiving a portable memory device such as a Universal Serial Bus "USB" flash drive), which comprises all the features enabling the implementation of the methods described herein, and which when loaded in a computer system is able to carry out these methods. A computer program in the present context means any expression, in any language, code or notation, of a set of instructions intended to cause a system having an information processing capability to perform a particular function either directly or after either or both of the following: a) conversion to another language, code or notation; and b) reproduction in a different material form.

As used herein, "digital device" generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like.

As used herein, "access point" (AP) generally refers to receiving points for any known or convenient wireless access technology which may later become known. Specifically, the term "access point" or AP is not intended to be limited to IEEE 802.11-based APs. APs generally function as an electronic device or system that is adapted to allow wireless devices to connect to a wired network via various communications standards.

As used herein, the term "interconnect" or used descriptively as "interconnected" is generally defined as a communication pathway established over an information-carrying medium. The "interconnect" may be a wired interconnect, wherein the medium is a physical medium (e.g., electrical wire, optical fiber, cable, bus traces, etc.), a wireless interconnect (e.g., air in combination with wireless signaling technology) or a combination of these technologies.

As used herein, "information" is generally defined as data, address, control, management (e.g., statistics) or any combination thereof. For transmission, information may be transmitted as a message, namely a collection of bits in a predetermined format. One type of message, namely a wireless message, includes a header and payload data having a predetermined number of bits of information. The wireless message may be placed in a format as one or more packets, frames, or cells.

As used herein, "wireless local area network" (WLAN) generally refers to a communications network that links two or more devices or systems using some wireless distribution method (for example, spread-spectrum or orthogonal frequency-division multiplexing radio), and usually provides a connection through an access point to the Internet;

and thus, providing users with the mobility to move around within a local coverage area and still stay connected to the network.

As used herein, the term "mechanism" generally refers to a component of a system or device to serve one or more functions, including but not limited to, software components, electronic components, electrical components, mechanical components, electro-mechanical components, etc.

As used herein, the term "embodiment" or "implementation" generally refers to an embodiment or "implementation" that serves to illustrate by way of example, but not limitation.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the description, discussions utilizing terms including "processing" or "computing" or "calculating" or "determining" or "displaying" or the like, refer to the action and processes of a computer system, or similar electronic computing device, which manipulates and transforms data represented as physical (electronic) quantities within the computer system's registers and memories, into other data similarly represented as physical quantities within the computer system memories or registers or other such information storage, transmission, or display devices.

Input/output or I/O devices (including but not limited to keyboards, displays, pointing devices, etc.) can be coupled to the system either directly or through intervening I/O controllers.

The particular naming and division of the modules, routines, features, attributes, methodologies, and other aspects are not mandatory or significant, and the mechanisms that implement the specification or its features may have different names, divisions and/or formats. Furthermore, as will be apparent to one of ordinary skill in the relevant art, the modules, routines, features, attributes, methodologies, and other aspects of the disclosure can be implemented as software, hardware, firmware or any combination of the three. Also, wherever a component, an example of which is a module, of the specification is implemented as software, the component can be implemented as a stand-alone program, as part of a larger program, as a plurality of separate programs, as a statically or dynamically linked library, as a kernel-loadable module, as a device driver, and/or in every and any other way known now or in the future to those of ordinary skill in the art of computer programming.

It will be appreciated to those skilled in the art that the preceding examples and embodiments are exemplary and not limiting to the scope of the present disclosure. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations, and equivalents that may fall within the true spirit and scope of the present disclosure.

While the present disclosure has been described in terms of various embodiments, the present disclosure should not be limited to only those embodiments described, but can be practiced with modification and alteration within the spirit and scope of the appended claims. Likewise, where a reference to a standard is made in the present disclosure, the reference is generally made to the current version of the standard as applicable to the disclosed technology area. However, the described embodiments may be practiced under subsequent development of the standard within the spirit and scope of the description and appended claims. The description is thus to be regarded as illustrative rather than limiting.

What is claimed is:

1. A non-transitory computer-readable medium comprising a set of instructions which, when executed by one or more hardware processors, causes performance of a set of operations comprising:
    identifying, during a first scan of a segment of a radio frequency spectrum of channels, a particular value for a parameter for at least a portion of a first channel of the radio frequency spectrum;
    responsive to identifying the particular value, modifying one or more scanning configurations comprising a width of one or more channels from the first scan;
    performing a second scan using the modified scanning configurations;
    determining an instance when the particular value is no longer detected in the second scan or another subsequent scan; and
    returning to using scanning configurations used in the first scan.

2. The non-transitory computer-readable medium of claim 1, wherein the one or more scanning configurations are modified to focus on the particular value for the parameter.

3. The non-transitory computer-readable medium of claim 1, wherein the particular value indicates that a signal detected on the portion of the first channel is an interfering signal.

4. The non-transitory computer-readable medium of claim 1, wherein the modified scanning configurations are determined based on the particular type of signal indicated by the parameter value, the particular type of signals being an interfering signal or a Wi-Fi signal.

5. The non-transitory computer-readable medium of claim 1, wherein the particular value indicates a noise level, and wherein focusing on the particular value is further based on a comparison of the particular value to a threshold noise value for the first channel.

6. The non-transitory computer-readable medium of claim 1, wherein the particular value indicates a channel utilization, and wherein focusing on the particular value is further based on a comparison of the particular value to a threshold channel utilization value for the first channel.

7. The non-transitory computer-readable medium of claim 1, wherein the particular value indicates a Wi-Fi channel utilization or non-Wi-Fi channel utilization, and wherein focusing on the particular value is further based on a comparison of the particular value to a threshold value.

8. The non-transitory computer-readable medium of claim 1, wherein the operations further comprise selecting the portion of the first channel as a second channel for scanning in the second scan.

9. The non-transitory computer-readable medium of claim 1, wherein the operations further comprise selecting a second channel that (a) covers a same portion of the radio frequency spectrum as the first channel and (b) uses a different primary channel than the first channel.

10. The non-transitory computer-readable medium of claim 1, wherein the operations further comprise:
    selecting a second channel, for scanning during the second scan, that includes a primary channel corresponding to the portion of the first channel and a secondary channel that does not correspond to the portion of a first channel.

11. The non-transitory computer-readable medium of claim 1, wherein the operations further comprise:
    selecting a second channel, for scanning in the second scan, of a broadest available width.

12. The non-transitory computer-readable medium of claim 1, wherein the operations further comprise:
    selecting a set of channels for scanning in the second scan, by selecting a broadest available width for each of the set of channels.

13. The non-transitory computer-readable medium of claim 1, wherein the operations further comprise selecting one or more channels, for scanning during the second scan, that does not include the portion of the first channel corresponding to the particular value for the parameter.

14. A non-transitory machine-readable medium comprising a set of instructions which, when executed by one or more hardware processors, causes performance of a set of operations comprising:
    selecting at least a portion of a radio frequency spectrum for scanning, the portion including at least one of contiguous and non-contiguous segments of the radio frequency spectrum;
    partitioning the portion of the radio frequency spectrum selected into a first plurality of channels, at least two of the first plurality of channels having different widths, each of the first plurality of channels including at least one of the contiguous and the non-contiguous segments;

during a first scan of the portion of the radio frequency spectrum selected, scanning the portion of the radio frequency spectrum selected, at least by scanning a first channel with a first width and scanning a second channel with a second width that is different from the first width; and during a second scan of the portion of the radio frequency spectrum selected, partitioning the portion into a second plurality of channels that are partitioned differently than the first plurality of channels, wherein partitioning the portion into the second plurality of channels is based on the data collected during the first scan.

15. The non-transitory machine-readable medium of claim 14, wherein the radiofrequency spectrum comprises non-contiguous portions.

16. The non-transitory machine-readable medium of claim 14, wherein the radio frequency spectrum comprises contiguous portions.

17. The non-transitory machine-readable medium of claim 14, wherein the data comprises information on one or more of 1) channel utilization, 2) signal strength, 3) noise floor, 4) adjacent channel interference, and 5) interference power.

18. A device comprising:
at least one hardware processor;
the device configured to perform operations comprising:
identifying, during a first scan of a segment of a radio frequency spectrum of channels, a particular value for a parameter for at least a portion of a first channel of the radio frequency spectrum;
responsive to identifying the particular value, modifying one or more scanning configurations comprising a width of one or more channels from the first scan;
performing a second scan using the modified scanning configurations;
determining an instance when the particular value is no longer detected in the second scan or another subsequent scan; and
returning to using scanning configurations used in the first scan.

19. The device of claim 18, wherein the particular value indicates at least one of (a) that a signal detected on the portion of the first channel is an interfering signal; (b) a noise level; (c) a channel utilization; and (d) a Wi-Fi channel utilization or non-Wi-Fi channel utilization.

20. The device of claim 18, wherein the modified scanning configurations are determined based on the particular type of signal indicated by the parameter value, the particular type of signals being an interfering signal or a Wi-Fi signal.

* * * * *